United States Patent [19]
Gerry

[11] 3,712,723
[45] Jan. 23, 1973

[54] SOUND SYNCHRONIZED SLIDE PROJECTOR

[76] Inventor: Martin E. Gerry, 13452 Winthrope Street, Santa Ana, Calif. 92705

[22] Filed: April 13, 1970

[21] Appl. No.: 27,937

Related U.S. Application Data

[60] Division of Ser. No. 736,542, May 28, 1968, which is a continuation-in-part of Ser. No. 528,707, Feb. 21, 1966.

[52] U.S. Cl. .................................... 353/19, 353/120
[51] Int. Cl. ...................... G03b 31/06, G03b 21/00
[58] Field of Search ......... 353/15, 16, 17, 18, 19, 120

[56] References Cited

UNITED STATES PATENTS

| | | | |
|---|---|---|---|
| 2,319,284 | 5/1943 | Zwirn | 353/117 |
| 3,078,762 | 2/1963 | Greenaway | 353/19 |
| 3,350,983 | 11/1967 | Gerry | 353/19 |
| 3,122,054 | 2/1964 | Dimitracopoulos | 353/19 |
| 3,131,937 | 5/1964 | Nakamatsu | 374/41.4 |
| 3,434,784 | 3/1969 | Stoyamoff | 353/120 |

FOREIGN PATENTS OR APPLICATIONS

| | | | |
|---|---|---|---|
| 1,045,122 | 11/1958 | Germany | 353/19 |
| 569,592 | 11/1957 | Italy | 353/15 |

*Primary Examiner*—Leonard Forman
*Assistant Examiner*—A. J. Mirabito

[57] ABSTRACT

The invention is directed to providing a member of an audio-visual projector together with the projector, the member containing a plural number of slides and an equal plural number of audio recording surfaces wherein the slides and recording surfaces are inseparable portions of the member. Associated with the various configurations of the member are suitable control mechanisms which enable synchronous recording of sound and reproduction of sound from these recording surfaces at the same time the related slide is being projected. The control mechanisms also provide automatic injection of slides and related sound tracks.

10 Claims, 16 Drawing Figures

INVENTOR
Martin E. Gerry

Fig. 7

INVENTOR.
Martin E Gerry

INVENTOR.

Martin Gerry

SOUND SYNCHRONIZED SLIDE PROJECTOR

PARENT APPLICATIONS

This is a division of copending application Ser. No. 736,542, filed May 28, 1968. Application 736,542 is a continuation-in-part of application Ser. No. 528,707 filed Feb. 21, 1966. This application results from restriction requirement of application Ser. No. 736,542. This application is identical in subject matter to application Ser. No. 528,707.

PRIOR ART

Prior sound and slide projectors do not provide for simple and reliable scanners for recording or reproducing sound tracks. Also, they do not include multiple slide and sound track means on a single integrated drum or disk, and hence result in expensive apparatuses.

Invention Summary

This invention relates to an improved projector for optically projecting visual information from a stationary slide and simultaneously recording or reproducing sound from a sound track. An advantage of this invention is that it includes a simple mechanical scanner for recording or reproducing sound tracks. Another advantage is the use of a novel and inexpensive drum or disk for storing and retrieving the visual information and for recording or reproducing the sound therefrom. Still another advantage of this invention is the provision for automatically and simply controlling the injection of visual and sound information, for programming visual and sound information for automatic sequential retrieval, and for automatically starting and stopping the slide arrangement at exactly the same slide position and at the same record-reproduce surface initial location of the record-reproduce head assembly.

Briefly, in accordance with the present invention, a sound synchronized slide projector includes a sound recording and reproducing system comprising a drum or a disk into which a plural number of slides or a film strip with a plural number of frames are inserted, and a segment of the drum or disk associated with a particular slide or frame of a film strip has as an integral part thereof a sound track. Sound is recorded or reproduced by means of a simple mechanical sound track scanner which has as an integral part thereof a record-reproduce head assembly, which starts from a particular location on the drum or disk, scans a segment of the drum or disk and then returns the record-reproduce head assembly to its exact starting location on the record-reproduce surface, automatically, and a control circuit stops the scan mechanism automatically. If the automatic programming switch is on, the next slide and associated sound track will be placed in position automatically, and the scanning mechanism will again scan and thereby record or reproduce the sound track associated with that particular slide, until all successive slides and associated sound tracks in the drum or disk will have been exhausted and the automatic control mechanism will have shut off the programmer, enabling a new drum or disk to be inserted in the projector. If the automatic programmer switch is off, single slide control and associated single sound track control is possible by means of a push button, manually operated after each scan termination of each slide and associated sound track.

The slide retainer drum or disk is rotatable within the projector and has a plural number of slide retaining windows in segmentary portions of the slide retainer means for providing means for retaining the visual information image means. A plural number of record-reproduce surfaces for the corresponding plural number of sound tracks are provided. Each of the plural number of record-reproduce surfaces have an individual sound track of a generally zig-zag configuration within the confines of the segmentary portions, the plural number of slide retaining windows being inseparable from the corresponding plural number of record-reproduce surfaces and being integral portions of the sound and slide retainer means. A shaft of an injection motor provides the rotational capability of the sound and slide retainer means.

Structural Relationships

Referring to FIGS. 1,2,3,4,5,8, and 9, brackets 3, 7, and 56 are mechanically affixed to main chassis 1 by means of screws. Optical projection lens assembly 2 is mechanically affixed to mounting bracket 3. Slide selection drive motor 35, automatic programming actuator microswitch 26, control scanner motor stop microswitch 31, and record-reproduce head assembly retract solenoid 49, are all mechanically affixed by means of bolts to main chassis 1. Light source 65, optics lens or projector lamp assembly 112, solenoid bracket 111, injection cycle microswitch 41, start relay enable microswitch 45, program termination microswitch 101, solenoid deenergizer microswitch 121, actuated gear shaft retainer brackets 5 and 25, and sliding bar retainer pivot mounting bracket 118, are all mechanically affixed by means of bolts to main chassis 1.

The sound track scanner is comprised of motor 6, shaft 8, gear 9, gear 10, cam 23, shaft 11, brackets 25 and 5, follower roller 16, slide bar retainer 15, sliding bar 14, head assembly 17, pitman arms 12 and 13, spring 54, bolt 55, bracket 56, pivot pin 18, spring 19, and pivot pins 20, 21, and 22.

Sound track scanner drive motor 6 is mechanically affixed by means of bolts to bracket 7 thus raising motor 6 to the required height to enable the coupling and cooperation of the teeth of actuator gear 9, which is mounted on shaft 8 of motor 6, with the teeth of actuated gear 10. The diameter ratio of gear 10 to gear 9 is 3 to 1, thereby causing three complete revolutions of gear 9 in order to revolve gear 10 once. Gear 10, sound track scanner control cam 23, and scan cycle timing cam 24 are all mechanically mounted on actuated gear shaft 11. Shaft 11 is suspended and mechanically held in an aperture in bracket 25 on one end, the other end being suspended in an aperture of bracket 5. Sliding bar retainer 15 has a follower roller 16 mechanically affixed to said retainer 15, and said roller 16 cooperates with the edge of cam 23. At the normally inoperative state of the sound track scanner, the highest portion of cam 23 cooperates with roller 16. Bracket 56 mechanically retains tension spring guide bolt 55 which extends through the axis of follower tension spring 54. Spring 54 cooperates with the side of sliding bar retainer 15 and applies pressure constantly against said sliding bar retainer 15 causing said sliding bar retainer 15 to hold follower roller 16 in cooperative relationship to the edge of cam 23 during rotation of cam 23, and also when cam 23 is at a standstill. Sliding bar 14 is inserted in and guided by sliding bar retainer 15, always cooperating in a sliding engagement with the inner surfaces of sliding bar retainer 15 when cam 23 is automatically rotated about the axis of shaft 11 by said shaft 11. Sliding bar retainer 15 has a lip with a hole through which sliding bar retainer pivot pin 22 is inserted, said pivot pin 22 being also inserted in a hole in bracket 118 and held thereby, so that the entire assembly retained and held by said sliding bar retainer 15 may be pivoted about the axis of pivot pin 22 when cam 23 is automatically rotated. Sliding bar 14 is mechanically attached by means of a pivot pin 18 to record-reproduce head assembly 17. Said head assembly 17 has as an integral part thereof record-reproduce head 64, which in the normal or pre-operative position the said assembly 17 is retracted by solenoid 49 which is normally electrically energized, and solenoid armature 50 normally is retracted into the coil of said solenoid 49 thereby retracting armature extension 51 which cooperates with record-reproduce assembly 17, thereby preventing head 64 from resting on magnetically coated recording surface 53 of drum 4, or preventing cooperation of recording head 64 with magnetically coated oxide upper surface of drum 109 containing ventilation holes 39, said upper surface of drum 109 being orthogonal to the planes of the windows 52a through 52t, or preventing cooperation of recording head 64 with the under or lower surface of sound and slide retainer disk 106 which has a magnetically coated recording undersurface, located adjacent to each of the inner edges of windows 52a through 52t of disk 106 circumjacent shaft 36. Record-reproduce head assembly tension spring 19 exerts pressure on assembly 17 to hold head 64 in cooperative relationship with recording surface of disk 106.

Figure 1:
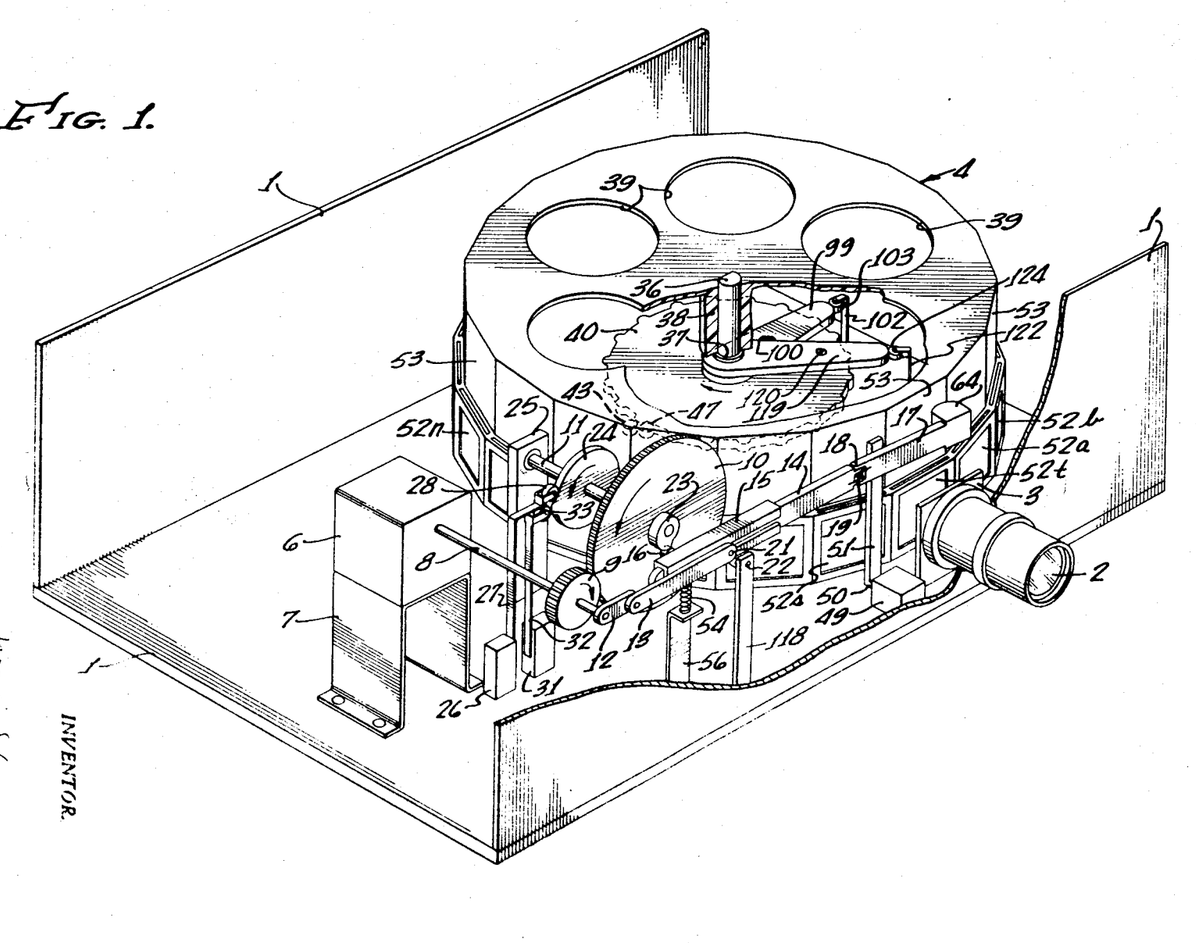
FIG. 1 is a perspective view partially in cross-section of the sound synchronized slide projector constructed in accordance with this invention.
Figure 2:
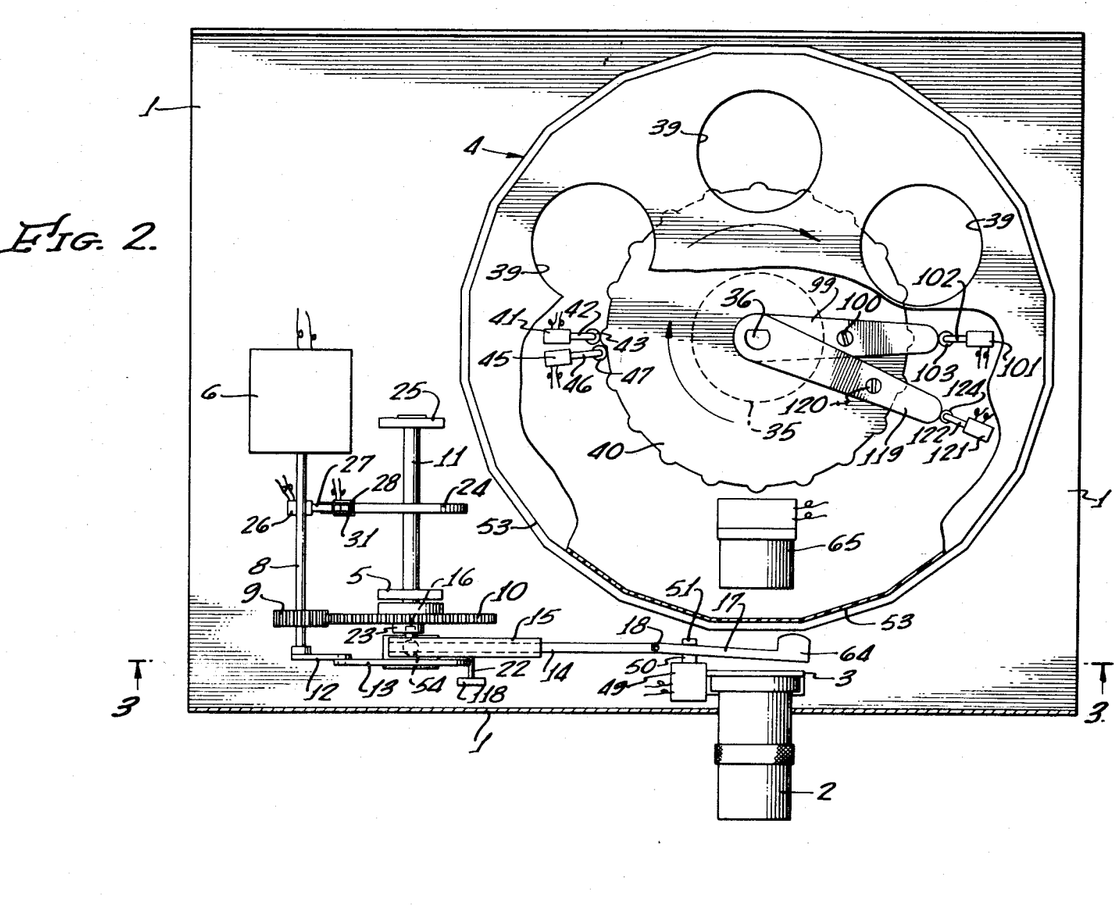
FIG. 2 is a top view partially in cross-section of the projector showing details of the injection control means and optics.
Figures 3, 4, 5:
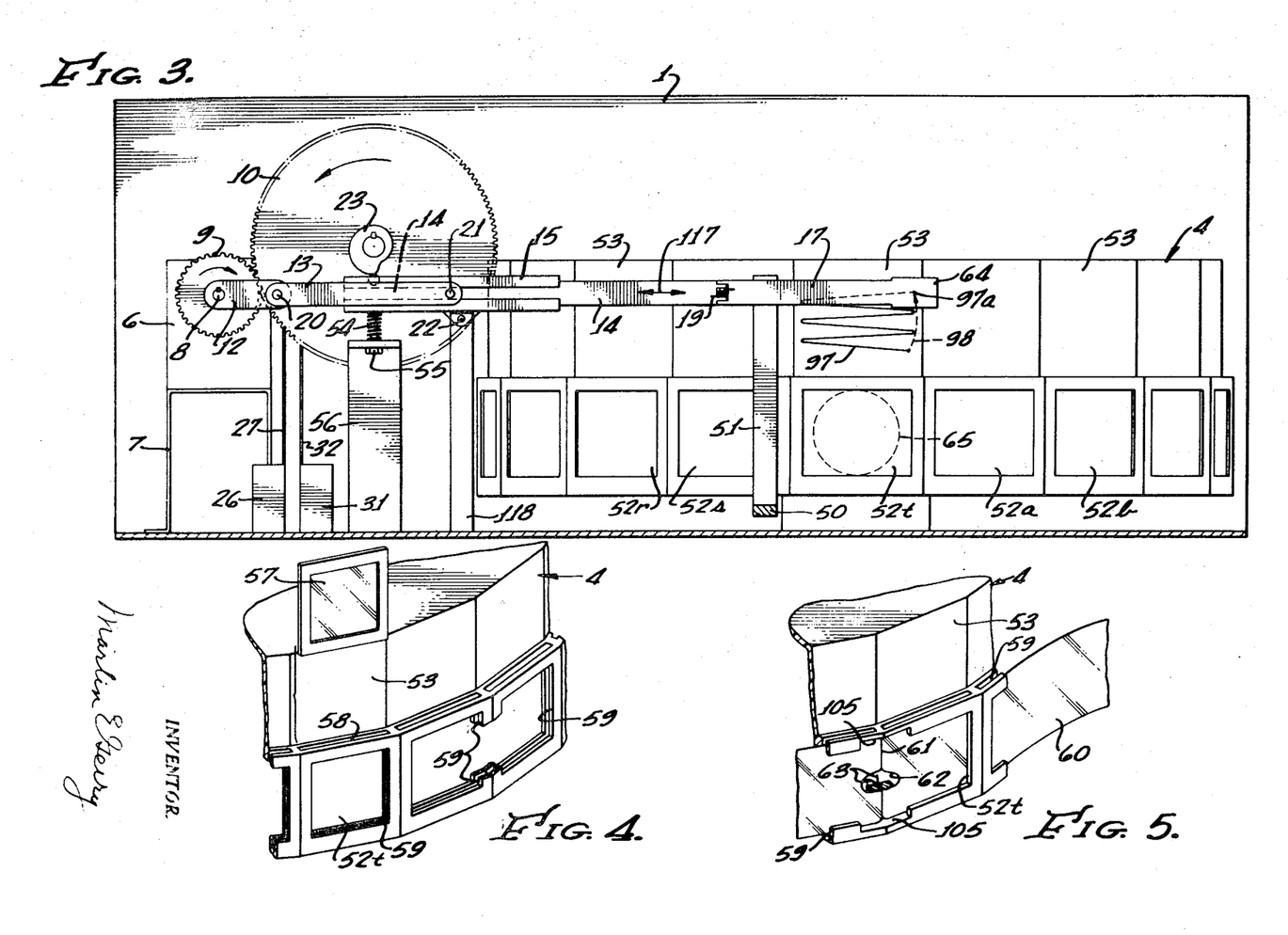
FIG. 3 is a sectional view taken along line 3—3 of FIG. 2 showing in elevation certain scanner details.
FIG. 4 is a perspective view partially in cross-section of a segment of the sound and slide retainer drum showing the manner in which slides are inserted into the retention windows.
FIG. 5 is a perspective view partially in cross-section of a segment of the sound and slide drum showing insertion and retention of a film strip in the window frames.

Pitman actuator arm 12 and gear 9 are mechanically affixed to shaft 8 of motor 6 and are rotated simultaneously when said shaft 8 is rotated by motor 6. Pitman actuated arm 13, gear 10, cam 23, and cam 24 are mechanically affixed to shaft 11 and are rotated simultaneously by shaft 11 due to cooperative engagement of the teeth of gear 9 with the teeth of gear 10, when said gear 9 is rotated by shaft 8 which is driven by motor 6. Pitman actuator arm 12 is mechanically attached to pitman actuated arm 13 by means of pivot pin 20, the other side of pitman actuated arm 13 being mechanically held to sliding bar 14 by means of pivot pin 21. Therefore, pitman actuator arm 12 is rotatable by shaft 8 of motor 6 and pivotable about the axis of pivot pin 20, and pitman actuated arm 13 is pivoted about the axis of pivot pin 20 on one side, and about the axis of pivot pin 21 on the other side, when the mechanical sound track scanner is driven by said motor 6, said motor 6 rotating in a clockwise direction. The sliding bar retainer 15 is pivoted about sliding bar retainer pivot pin 22; pivot pin 22 and lip of sliding bar retainer 15 are both mechanically affixed to bracket 118, thereby permitting a limited degree of pivoting action of sliding bar retainer 15 and the components attached thereto, about the axis of pivot pin 22 when cam 23 is automatically rotated counterclockwise, being driven by gear 10 which is mechanically coupled to driving gear 9, the teeth of gear 9 and gear 10 engaged in mechanical cooperation with each other. Follower roller 16 being mechanically attached to sliding bar 15 is pressed against the edge of cam 23 by action of spring 54, thereby insuring that sliding bar retainer 15 constantly follows the contour of cam 23 when said cam 23 is automatically driven as aforementioned. When motor 6 is electrically energized, gear 9 and pitman actuator arm 12 will describe a clockwise rotation moving pitman arm 13 which will assume the several angular positions as described by FIGS. 6a through 6h, and sliding bar 14 will generally move in a reciprocating motion in the directions described by direction arrow 117. Record-reproduce head assembly 17 will exactly follow motion of sliding bar 14. The various angular positions of cam 23 and gear 10 are compared with the angular rotation of gear 9 will be hereinafter discussed in detail. Follower roller 28 mechanically affixed to movable contactor 27 of microswitch 26 cooperates with the edge of cam 24 and is normally positioned on the low portion of same cam 24, and follower roller 33 mechanically affixed to movable contactor 32 of microswitch 31, cooperates with the edge of cam 24 and is normally positioned on the high portion of cam 24, so that when said cam 24 is automatically rotated due to the counterclockwise rotation of gear 10 driven by gear 9, cam 24 is also rotated in a counterclockwise direction so that follower roller 33 following cam 24 contour, almost immediately is positioned at the low portion of cam 24, but follower roller 28 remains on the low portion of cam 24 until 355° of cam 24 rotation is completed, corresponding to 355° of cam 23 counterclockwise rotation. Motor 35 has driveshaft 36 which is flattened on one edge to provide a keyed shaft for properly positioning or loading into the projector at the correct azimuth angle either a drum or a disk having a plural number of sound tracks associated with a plural number of slides or film strip frames, each sound track having a corresponding slide mounted in permanent relationship to each respective sound track, Shaft 36 has mechanically mounted thereon and affixed thereto injection control cam 40 together with extension arm 99 which is mechanically affixed to cam 40 by means of retainer screw 100, and extension arm 119 which is mechanically affixed to cam 40 by means of retainer screw 120. Shaft 36 has mounted directly above cam 40, drum or disk seat bushing 37 on which is seated drum sleeve 38 when drum 4 or a corresponding sleeve to drum sleeve 38 when drum 109 is used, or disk 106 is seated on bushing 37, shaft 36 extending through a hole at the center of disk 106, when said disk 106 is used. When either drum 4 or drum 109 is used, shaft 36 is inserted through keyed sleeve 38 located at the center of either drum. It should be emphasized that three basic configurations of combination sound track and slide are illustrated respectively in FIGS. 1, 8, and 9. However, for the drum configurations it is possible to have slide inserts as illustrated in FIG. 4 or a continuous film strip as illustrated in FIG. 5. Under normal or preoperative mode conditions, cam 40 cooperates at its high portion with follower 43 mechanically affixed to movable contactor 42 of injection cycle microswitch 41, with follower 47 mechanically affixed to movable contactor 46 of start relay microswitch 45, with follower 103 mechanically affixed to movable contactor 102 of program termination microswitch 101, and with follower 124 mechanically affixed to movable contactor 122 of microswitch 121, are affixed to cam 40, so that when cam 40 is automatically rotated clockwise by shaft 36 of motor 35, follower 43 following the contour of cam 40 moves off the high portion of said cam 40 to the low portion of said cam 40 to start the slide selection drive motor 35, said motor 35 remaining electrically energized until 18° of drum or disk segment rotation has occurred corresponding to one-twentieth of 360° of rotation, or corresponding to one slide window dimension for each of the 20 slides arranged in the disk or drum. The follower 43 will remain on the low portion of cam 40 until the next high portion of same cam 40 cooperates with follower 43 after 18° of cam 40 rotation, at which time motor 35 will be automatically deenergized and stopped. Cam 40 has a high portion every 18° for a total of 20 high portions, one high portion corresponding to each slide positioned in the 20 windows 52a through 52t, of either of the drums or of the disk. Cam 40 has 20 low portions, each low portion alternating with each high portion of said cam 40. Follower 47 under these circumstances will be positioned from the first low portion of cam 40 to the second high portion of cam 40 and thereby causes control relay 66 to be electrically enabled and operated, and then follower 47 will come to rest on the second low portion of cam 40 at the conclusion of injection of the first slide and corresponding sound track. Follower 103 cooperating with extension arm 99 will also under these circumstances move in a clockwise direction as cam 40 is rotated, causing said follower roller 103 to cease to cooperate with extension arm 99, said action of roller 103 and arm 99 will cause program termination microswitch 101 to be operated so that microswitch contactors 102 and 104 cooperate with each other, remaining in said cooperative relationship until all 20 slides have been completely programmed, and cam 40 and extension arm 99 returned to the normal positions as shown in FIGS. 1, 2, and 7. Likewise follower roller 124 cooperating with extension arm 119 will also under these circumstances move in a clockwise direction as cam 40 is rotated, causing said roller 124 to cease to cooperate with extension arm 119, said action of roller 124 and extension arm 119 will cause solenoid deenergizer microswitch 121 to be operated so that microswitch contactors 122 and 123 cease to cooperate with each other, remaining in a noncooperative relationship until all 20 slides have been completely programmed and cam 40 and extension arm 119 is returned to the normal position as shown in FIGS. 1, 2, and 7. It should be noted that the use the words follower, roller, or follower roller are interchangeable in their usage herein.

When sound and slide retainer drum 4 is utilized in one configuration, mounted slides 57 are inserted into each of the 20 slide retension windows 52a through 52t, through slide insert apertures 58 and are held by ridges 59 in said windows 52a through 52t. Each of the 20 surfaces 53 are coated with a magnetic oxide material for recording a magnetic sound track 97 thereon and for reproducing said magnetic sound track 97 therefrom. When a continuous film strip 60 is used in another configuration (FIG. 5) in lieu of the mounted slides 57, the magnetic sound track is identical to that of the configuration wherein the mounted slides are used, but the film strip 60 is inserted in ridges 59 forming substantially a complete circle of photographic frames, each of which is located in the center of windows 52a through 52t. Cutaway sections 105 are provided at the juncture of window frames 52s and 52t corresponding to the meeting of the ends of the film strip 60, and the two adjacent frames of windows 52s and 52t abutting each other, are slightly separated from each other (not molded to each other) at film retainer slot 61 in order that the ends of the film may be forced into and held by said slot 61. Cutaway section 62 shows the ends 63 of film 60 retained in film retainer slot 61. When either of the aforementioned configurations of drum 4 is used, light source assembly 65 is used to illuminate either the mounted slide or the film strip, since said light source 65 is located directly behind windows 52a through 52t when said drum 4 successively positioned for projection of the slides retained therein. When any particular window is programmed for projection, the light source illuminates the image on the slide and said image is projected through optical assembly 2. Drum ventilation holes 39 are used in drum 4 for expulsion of heat generated by the projection lamp.

Figure 8:
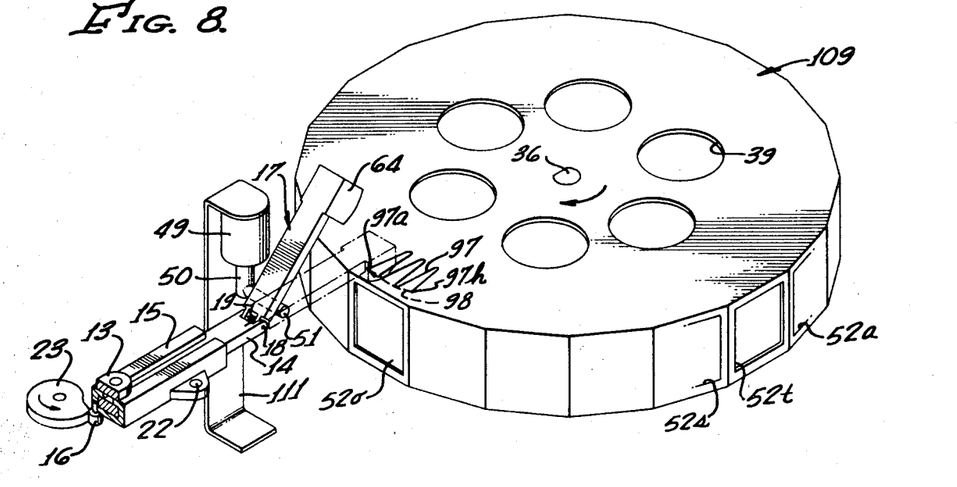
FIG. 8 is a perspective view partially in cross-section of a sound and slide drum and a portion of the sound track scanner mechanism.

When sound and slide retainer drum 109 is used in conjunction with mounted slides and with an optical system as in the case of drum 4, said drum 109 is inserted and retained on keyed shaft 36 identically to the manner in which drum 4 is inserted and retained. The scanning mechanism used for recording and reproducing sound track 97 and return trace 98 is identical to the scanning mechanism used in conjunction with drum 4 excepting that this scanning mechanism is displaced 90°, and oriented in a plane orthogonal to the plane of orientation when used in conjunction with drum 4, so that sound track 97 is recorded or reproduced 90° or 5 slides away from the particular slide being projected and on the surface containing ventilation holes 39 with which the said sound track 97 is associated. Also, each of the sound tracks 97, and return traces 98 which return the record-reproduce head assembly 17 and consequently the record-reproduce head 64 to its initial position 97a, are recorded on and reproduced from the magnetic oxide coated surface of drum 109 in which ventilation holes 39 are located. FIG. 8 illustrates the relationship of the sound track scanning mechanism with respect to drum 109, and shows the normal or pre-operative position of record-reproduce head assembly 17 directly after drum 109 is inserted into the projector, and also shows in phantom the position of assembly 17 immediately preceding the scan of sound track 97, the record-reproduce head 64 being positioned at point 97a, and when the first slide inserted in window 52a is automatically injected, control relay 66 is automatically operated starting the scan cycle.

Figure 9:
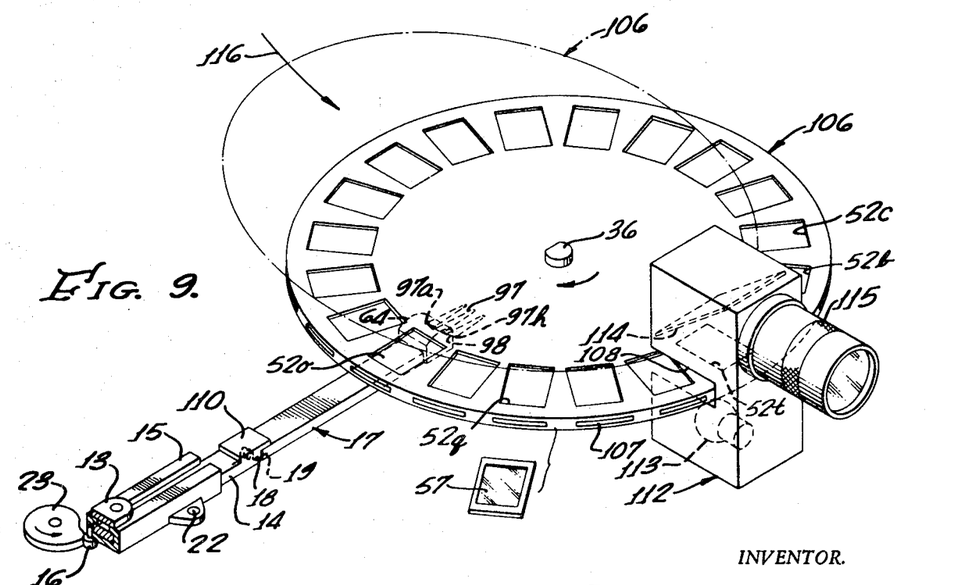
FIG. 9 is a perspective view of a combination sound and slide disk, a portion of the sound track scanner mechanism partially in cross-section, and the associated slide projection lens and lamp assembly.

When sound and slide retainer disk 106 is used, the sound track scanner mechanism is oriented as in the case of drum 109 excepting that record-reproduce head 64 is 180° inverted, the magnetic oxide coating being on the undersurface of said disk 106, said disk 106 being in cooperative relationship with head 64 when said disk 106 is loaded in the projector in the direction indicated by arrow 116, and identically to drum 109, shaft 36 extends through center of disk 106, said disk seating itself on bushing 37. A portion of said disk 106 retaining mounted slides 57 inserted through slots 107 are held in windows 52a through 52t of said disk 106, and one of said windows, namely 52t is positioned in slot 108 of the optical assembly 112. Said assembly 112 is comprised of projection lamp 113 which illuminates slide 57 through window 52t and projects slide 57 image on to mirror 114, and is reflected by mirror 114 into lens assembly 115 which projects the image reflected by mirror 114 through said lens assembly 115 on to an external viewing screen. In programming the plural number of slides 57 situated and held in windows 52a through 52t, each of the said plural number of slides is successively and sequentially illuminated as the disk retaining said slides in said windows 52a through 52t is rotated through a 360° rotation. Inasmuch as spring tension of spring 19 will keep record-reproduce head assembly 17 in tension so that head 64 is in cooperative relationship with the underside of disk 106, no solenoid retraction mechanism is needed for this configuration; however, when disk 106 is removed, limit travel stop 110 is necessary and used in order to prevent upward travel of record-reproduce head assembly 17 due to tension of spring 19 on said record-reproduce head assembly 17.

Electrical Relationship

Referring to FIG. 7, direct current power means 95 is electrically connected by means of wire to stationary contact 79 of slide selector push button 77 and then to movable contact 42 of injection cycle microswitch 41 and then to stationary contact 48 of start relay enable microswitch 45 and then to movable contact 122 of solenoid deenergizer microswitch 121 as well as to movable contact 72 of control relay 66 and to movable contact 27 of automatic programming actuator microswitch 26. Movable contact 72 is also electrically connected by means of wire to movable contact 32 of control scanner motor stop microswitch 31. Direct current power means 95 is also electrically connected by means of wire to modulator 93 to serve as a power means for said modulator 93 and to amplifier 94 to serve as a power means for said amplifier 94. Common power and signal return means 96 is electrically connected by means of wire to return side of slide selection drive motor 35, to return side of coil 67 of control relay 66, to return side of solenoid coil 49, to return side of sound track scanner drive motor 6, to return side of record-reproduce head 64, to return side of loud speaker 91, to return side of microphone 92, to return side of modulator 93, and to return side of amplifier 94. Stationary contact 80 of slide selector push button 77 is electrically connected by means of wire to stationary contact 44 of injector cycle microswitch 41 and to stationary contact 104 of program termination microswitch 101. Contact 44 of injection cycle microswitch 41 is electrically connected by means of wire to the input side of motor 35. Movable contact 75 of automatic programming switch 74 is electrically connected by means of wire to movable contact 102 of program termination microswitch 101. Movable contact 46 of start relay enable microswitch 45 is electrically connected by means of wire to the input side of coil 67 of control relay 66 and also to stationary contact 69 of control relay 66. Movable contact 68 of control relay 66 is electrically connected by means of wire to stationary contact 29 of automatic programming actuator microswitch 26. Stationary contact 123 of solenoid deenergizer microswitch 121 is electrically connected by means of wire to the input side of coil of solenoid 49. Stationary contact 73 of control relay 66 is electrically connected by means of wire to the input side of sound track scanner drive motor 6. Movable contact 72 of control relay 66 is electrically connected by means of wire to movable contact 32 of control scanner motor stop microswitch 31. Stationary contact 73 of control relay 66 is electrically connected by means of wire to stationary contact 34 of control scanner motor stop microswitch 31. Stationary contact 76 of automatic programming switch 74 is electrically connected by means of wire to stationary contact 30 of automatic programming actuator microswitch 26. Output of modulator 93 is electrically connected by means of wire to stationary contact 83 of record-reproduce mode selector switch 81. Movable contact 82 of record-reproduce mode selector switch 81 is electrically connected by means of wire to the input side of record-reproduce head 64 and to stationary contact 86 of record-reproduce mode selector switch 81. Stationary contact 84 is electrically connected by means of wire to stationary contact 90, both of the same record-reproduce mode selector switch 81. Movable contact 88 of record-reproduce mode selector switch 81 is electrically connected by means of wire to the signal input side of amplifier 94. The signal output side of amplifier 94 is electrically connected by means of wire to movable contact 85 of record-reproduce mode selector switch 81. Stationary contact 87 of record-reproduce mode selector switch 81 is electrically connected by means of wire to the signal input side of loud speaker 91. Stationary contact 89 of record-reproduce mode selector switch 81 is electrically connected by means of wire to the signal input side of microphone 92.

Visual Information and Sound Track Relationship

Referring to FIGS. 1, 3, 8, and 9, the visual information and sound track are positioned and related with respect to each other in three different ways which are illustrated by drum 4, drum 109, and disk 106.

In the case of drum 4, said drum 4 is seated on bushing 37 and keyed motor shaft 36 extends through drum sleeve 38 at the axis of rotation of said drum 4. Under normal or pre-operative mode, when drum 4 is inserted into the projector and installed on the aforementioned shaft 36, window 52t or the 20th window is aligned with optical assembly 2. Automatic clockwise rotation of drum 4 when push button 77 is momentarily manually depressed, positions said drum 4 so that window 52a (the first window) is aligned with optical assembly 2. Subsequent manual operation of push button 77 will inject slides and accompanying sound tracks in sequence and, after switch 74 had been manually operated so that contacts 75 and 76 cooperate with each other, enables automatic sequential programming of the remaining second through the 20th windows, corresponding to windows 52b through 52t as hereinabove described. In drum 4, sound tracks 97 and return traces 98 will be located on surfaces 53 which are substantially in the same planes and positioned directly above the planes of the windows 52a to 52t. These individual sound tracks 97 and return traces 98 are associated with each of the said windows 52a through 52t in which visual information slides or film strip frames are positioned and therein aligned.

In the case of drum 109, the insertion and seating of said drum 109 in the projector and the 20 windows, 52a through 52t, are identical to that of drum 4 as above described. The sound tracks 97 and return traces 98 are identical in pattern and character to that of the sound tracks and return traces of drum 4, but the location of each of the planes of the 20 sound tracks and return traces will be orthogonal to any and all of the planes of windows 52a through 52t, and each sound track and return trace will be displaced 90° with respect to its corresponding visual information slide or film strip frame.

In the case of disk 106, the insertion of said disk 106 into the projector is similar to that of drum 4, except that the periphery of disk 106 in which window 52t is located and is an integral part of disk 106, is also inserted into slot 108 of optical assembly 112 when said disk 106 is initially positioned and inserted into the projector. The windows 52a through 52t retaining mounted slides 57 or frames from film strip 60, are located at the outer periphery of disk 106, and are generally positioned in the same plane as the plane of disk 106. The sound tracks corresponding to each of the windows retaining visual information are substantially in the same plane as each of the said windows 52a through 52t, and are located on the undersurface of said disk 106. As in the case of drum 109, said sound tracks 97 and return traces 98 are displaced 90° with respect to the particular slide or film strip frame associated therewith. Said sound tracks 97 and return traces 98 are positioned between the inner edges of windows 52a through 52t, which edges are nearest to shaft 36 and said shaft 36, thereby causing said sound tracks 97 and return traces 98 to encircle said shaft 36.

Mechanical Scanning of Sound Track and Return Trace

Figure 6A:
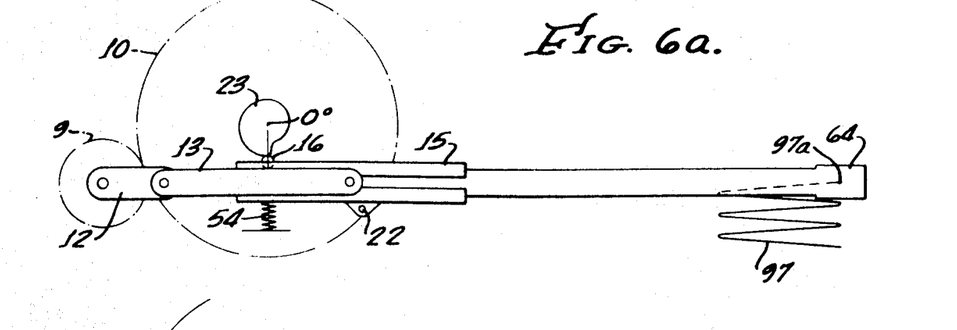
FIG. 6a is an elevation view of the scanner mechanism showing the relative position of the moving parts of this mechanism at the initial or start location of the record-reproduce head assembly and the location of the record-reproduce head at point 97a of the record-reproduce sound track.
Figure 6B:
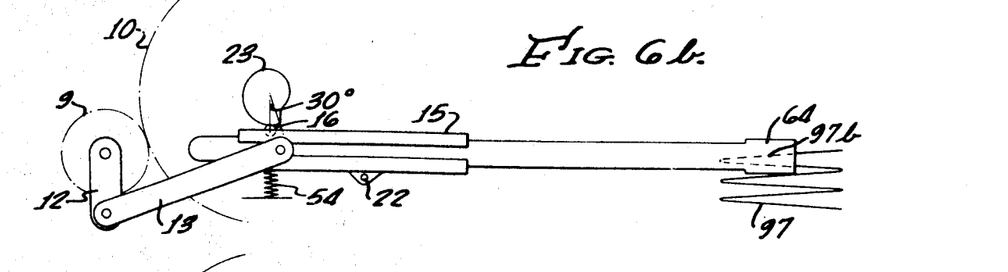
FIG. 6b is an elevation view of the scanner mechanism showing the relative position of the moving parts of this mechanism after 30° of rotation of the sound track scanner control cam has occurred and the record-reproduce head is positioned at point 97b on the record-reproduce sound track.
Figure 6C:
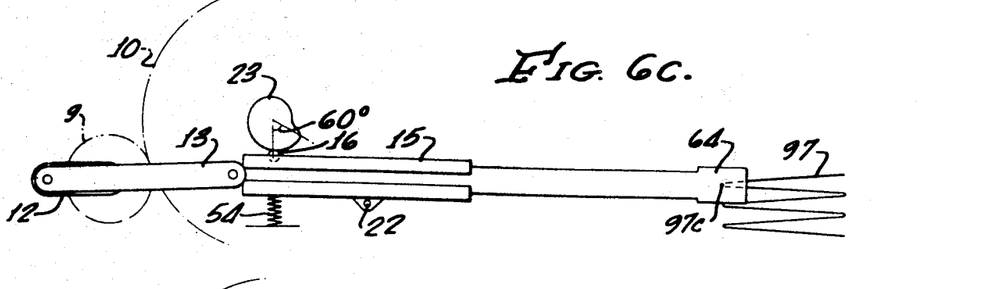
FIG. 6c is an elevation view of the scanner mechanism showing the relative position of the moving parts of this mechanism after 60° of rotation of the sound track scanner control cam has occurred and the record-reproduce head is positioned at point 97c on the record-reproduce sound track.
Figure 6D:
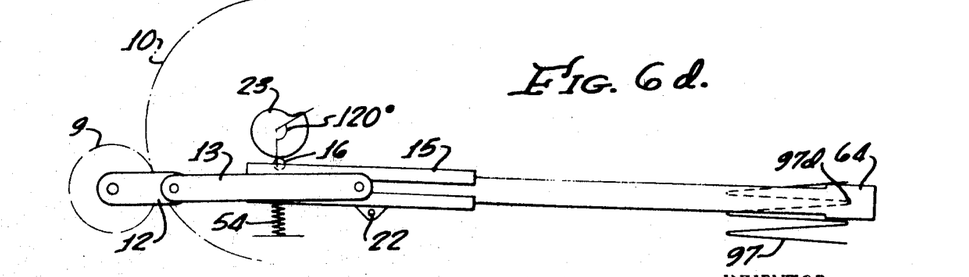
FIG. 6d is an elevation view of the scanner mechanism showing the relative position of the moving parts of this mechanism after 120° of rotation of the sound track scanner control cam has occurred and the record-reproduce head is positioned at point 97d on the record-reproduce sound track.
Figure 6E:
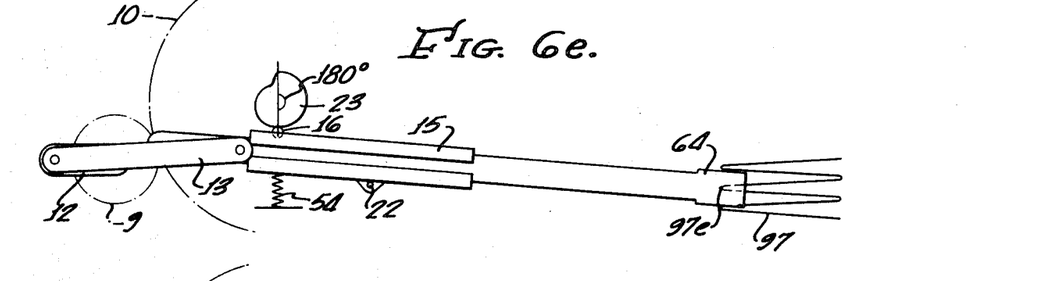
FIG. 6e is an elevation view of the scanner mechanism showing the relative position of the moving parts of this mechanism after 180° of rotation of the sound track scanner control cam has occurred and the record-reproduce head is positioned at point 97e on the record-reproduce sound track.
Figure 6F:
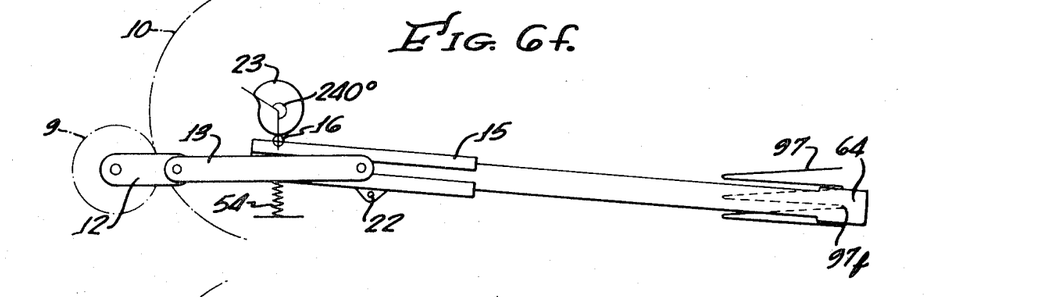
FIG. 6f is an elevation view of the scanner mechanism showing the relative position of the moving parts of this mechanism after 240° of rotation of the sound track scanner control cam has occurred and the record-reproduce head is positioned at point 97f on the record-reproduce sound track.
Figure 6G:
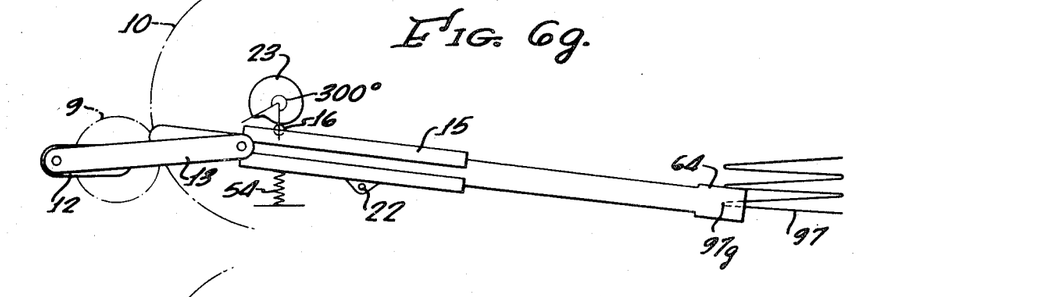
FIG. 6g is an elevation view of the scanner mechanism showing the relative position of the moving parts of this mechanism after 300° of rotation of the sound track scanner control cam has occurred and the record-reproduce head is positioned at point 97g on the record-reproduce sound track.
Figure 6H:
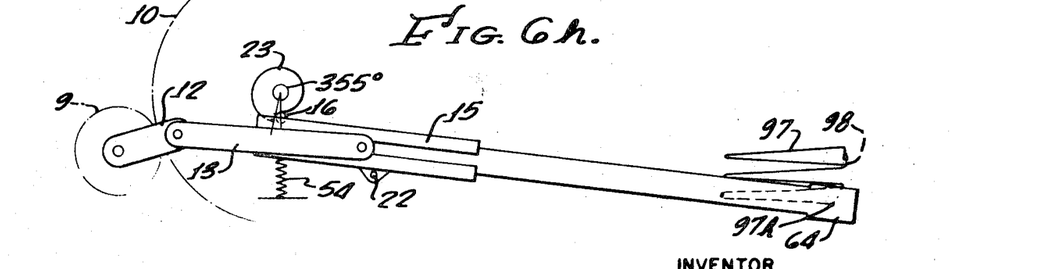
FIG. 6h is an elevation view of the scanner mechanism showing the relative position of the moving parts of this mechanism after 355° of rotation of the sound track scanner control cam has occurred and the record-reproduce head is positioned at point 97h on the record-reproduce sound track. This figure also shows the path taken by the record-reproduce head during the final 5° of scanner control cam rotation in order to automatically return the record-reproduce head assembly to its initial or start location thereby returning the record-reproduce head to point 97a on the record-reproduce sound track.
Figure 7:
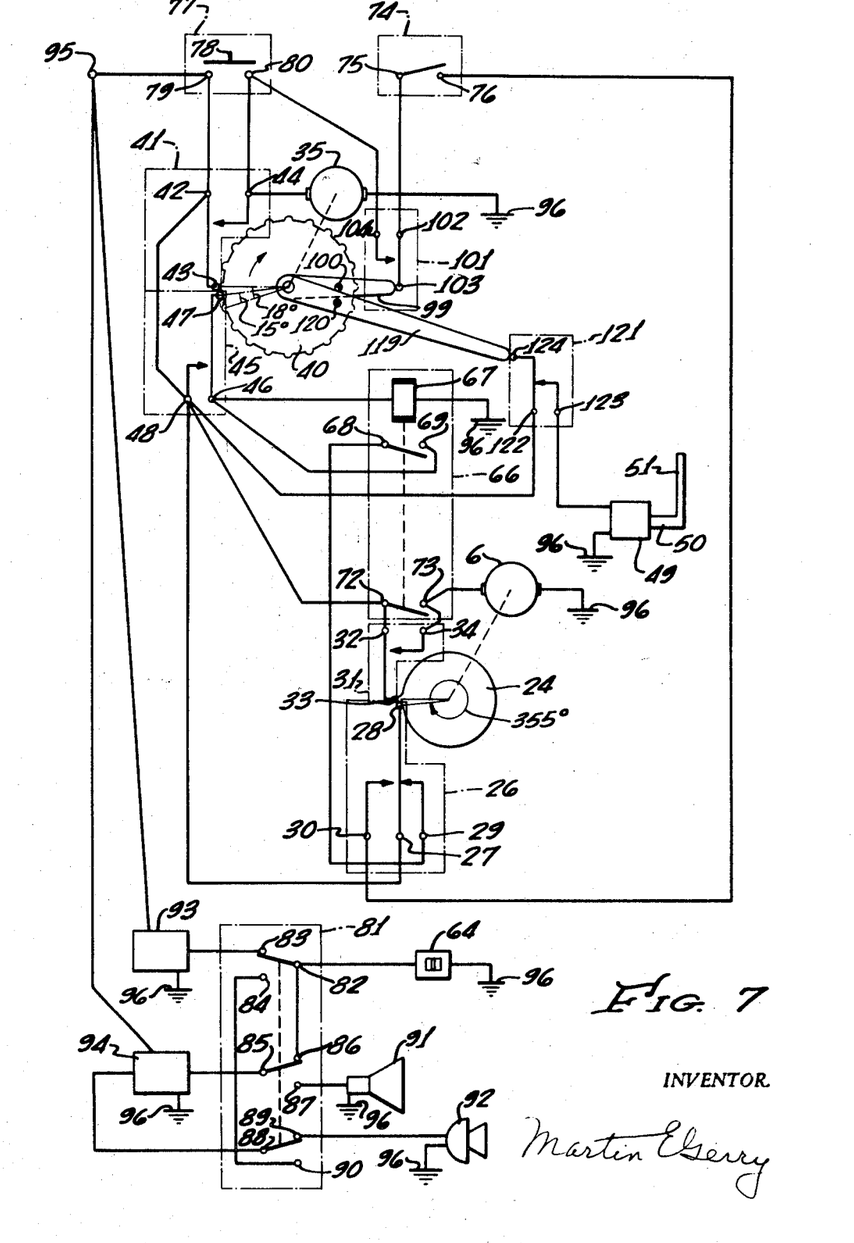
FIG. 7 is a schematic diagram showing the control system circuitry and the record-reproduce electronic circuit of this invention.

Referring to FIGS. 6a through 6h, which schematically depict several positions of the components of the mechanical scanner, and referring to FIG. 3, and starting with the initial position at the location where recording or reproducing of the sound track occurs, FIG. 6a shows the record-reproduce head assembly 17 and consequently the record-reproduce head 64 positioned at point 97a of sound track 97, gear 10, cam 23, and gear 9 at their respective initial or zero degree positions, and pitman arms 12 and 13 forming a 180° angle with respect to each other. When motor 6 is automatically electrically energized thereby driving the scanner mechanism to the position as shown in FIG. 6b, the record-reproduce head assembly 17 and consequently the record-reproduce head 64 will be positioned at point 97b of sound track 97, gear 10 and cam 23 will be displaced 30° with respect to the initial position of cam 23, and gear 9 being one-third the diameter of gear 10 will be displaced 90°, and pitman arms 12 and 13 will form approximately a 60° angle with respect to each other. When motor 6 is further automatically energized so that the scanner mechanism is positioned as shown in FIG. 6c, the record-reproduce head assembly 17 and consequently the record-reproduce head 64 is positioned at point 97c of sound track 97, gear 10 and cam 23 are displaced 60° with respect to the initial position of cam 23, and gear 9 is rotated 180° with respect to its initial position, and pitman arms 12 and 13 overlap each other. When motor 6 is further automatically energized so that the scanner mechanism is as shown in FIG. 6d, the record-reproduce head assembly 17 and consequently the record-reproduce head 64 is positioned at point 97d of sound track 97, gear 10 and cam 23 will be displaced 120° with respect to the initial position of cam 23, gear 9 will be displaced 360° with respect to its initial position, and pitman arms 12 and 13 will form a 180° angle with respect to each other. When motor 6 is further automatically activated so that the scanner mechanism is as shown in FIG. 6e, the record-reproduce head assembly 17 and consequently the record-reproduce head 64 is positioned at point 97e of sound track 97, gear 10 and cam 23 will be displaced 180° with respect to the initial position of cam 23, gear 9 will be displaced 540° with respect to its initial position, and pitman arms 12 and 12 will overlap each other. When motor 6 is further automatically activated so that the scanner mechanism is as shown in FIG. 6f, the record-reproduce head assembly 17 and consequently the record-reproduce head 64 is positioned at point 97f of sound track 97, gear 10 and cam 23 will be displaced 240° with respect to the initial position of cam 23, gear 9 will be displaced 720° with respect to its initial position, and pitman arms 12 and 13 will form a 180° angle with respect to each other. When motor 6 is further automatically activated so that the scanner mechanism is as shown in FIG. 6g, the record-reproduce head assembly 17 and consequently the record-reproduce head 64 is positioned at point 97g of sound track 97, gear 10 and cam 23 will be displaced 300° with respect to the initial position of cam 23, gear 9 will be displaced 900° with respect to its initial position, and pitman arms 12 and 13 will overlap each other. When motor 6 is further automatically activated so that the scanner mechanism is as shown in FIG. 6h, the record-reproduce head assembly and consequently the record-reproduce head 64 is positioned at point 97h of sound track 97, gear 10 and cam 23 will be displaced 355° with respect to the initial position of cam 23, gear 9 will be displaced 1,065° with respect to its initial position, and pitman arms 12 and 13 will be displaced approximately 160° thereby forming an angle of 160° with respect to each other. Further automatic activation of motor 6 will cause the record-reproduce head assembly 17 and consequently the record-reproduce head 64 to be returned to its starting position 97a of sound track 97, following the path described by return trace 98, at which point the scanner motor 6 and the mechanism which it drives will be automatically stopped. Cam 23 and gear 10 will have been returned to their initial locations or positions having completed 360° of rotation, and gear 9 will have been displaced or rotated 1,080°.

Substantially three full cycles of the sound track were completed between points 97a and 97h of sound track 97, by the scanner mechanism, the last 5° of cam 23 rotation being utilized for the return trace 98. If it is desired to increase the number of cycles to 4 cycles, the ratio of gear 10 to gear 9 is changed to 4 to 1. If 5 cycles are desired, then the gear ratio of gear 10 to gear 9 is changed to 5 to 1, and so on. It is therefore seen that the gear ratio of gear 10 to gear 9 is directly proportional to the number of scan cycles. The length of an individual segment of the trace such as between points 97a and 97c, is directly proportional to the difference in length between pitman arm 13 and pitman arm 12 as evidenced in FIG. 6c where the two pitman arms 12 and 13 are shown overlapped. Therefore, the criteria of the sound track length and the number of cycles per sound track is established for the various combinations desired and for the record-reproduce time required. In the illustrations FIGS. 6a through 6h approximately 6 inches of sound track is illustrated, and at a linear scan rate of ½ inch per second, 12 seconds of record-reproduce time is possible. Longer playing time however is accomplished by either lengthening the pitman arms and/or changing the gear ratios as hereinabove described. Pivoting action of the scanner members 12, 13, and 15 are as described elsewhere in this specification. Positive following action of member 15 retaining roller 16 affixed thereto and following the contour of cam 23 is accomplished as said cam 23 is automatically rotated, due to the fact that spring 54 pressing against member 15 thereby causing roller 16 to press against the contour of cam 23. Cam 23, gear 10, each have keyways and are mechanically affixed on keyed shaft 11, and gear 9 has a keyway and is mechanically affixed on keyed shaft 8.

Although the mechanical scanner describes an oscillatory or zig-zag sound track pattern for the record-reproduce head assembly 17 and consequently the record-reproduce head 64 follows said sound track 97, and then returns the record-reproduce head assembly 17 and hence the record-reproduce head 64 to its predetermined start position 97a from oscillatory scan termination point 97h along path or trace 98, the type or shape of sound track may be predetermined by the placement and sizing of the components comprising the mechanical sound track scanner so that any shape sound track may be thereby achieved.

Pre-Operative (Normal) Mode

Referring to FIGS. 1, 2, 3, 7, 8, and 9, solenoid 49 is utilized in conjunction with the configurations using drums 4 or 109. In this mode, electrical energy is applied to solenoid 49 through cooperating contacts 122 and 123 of solenoid deenergizer microswitch 121, and said solenoid armature 50 is retracted, thereby retracting extension 51 which causes record-reproduce head assembly 17 to be retracted preventing cooperation of record-reproduce head 64 with surface 53 of drum 4, or prevents record-reproduce head 64 from cooperating with the surface containing ventilating holes 39 of drum 109, when said drum 109 is used. When disk 106 is used, no solenoid is needed inasmuch as head 64 always cooperates with the magnetic record-reproduce undersurface of said disk 106 as soon as said disk 107 is loaded into projector as shown by direction arrow 116, and positioned on shaft 36. Either drum 4, drum 109, or disk 106 when loaded on shaft 36 are positioned on the 20th or last slide or visual information frame window 52t. This is so arranged in order that upon activation of the record or reproduce cycle by manually depressing push button 77 so that movable contactor 78 will cooperate with stationary contacts 79 and 80 to enable direct current power to be applied to motor 35 so that shaft 36 will rotate in a clockwise direction and thereby rotate drums 4 or 109 or disk 106, so that the first slide or visual information frame in window 52a is directly aligned with either optical assembly 2 or optical assembly 112 as the case might be, and the corresponding sound track 97 is in a position to be scanned by the mechanical scanner hereinabove described. Follower roller 43 therefore initially cooperates with the high portion of cam 40 corresponding to the 20th or last slide or visual information frame located in window 52t, follower roller 47 initially cooperates with the 20th low portion of said cam 40, and follower roller 103 cooperates with extension arm 99, and follower roller 124 cooperates with extension arm 119, so that upon electrical activation of motor 35, the follower rollers 43 and 47 will be automatically repositioned upon the first high and first low portion of cam 40 corresponding with the first slide position, window 52a, drums 4 or 109 or disk 106 will be automatically positioned so that the first slide or film strip frame is aligned with its particular optical assembly ready for projection of said slide or film strip frame, and the roller 103 will cease to cooperate with extension arm 99 to enable direct current power to be supplied to automatic programming switch 74 by virtue of continuous cooperation of contacts 102 and 104 of program termination microswitch 101 for the complete duration of sequential programming of slides 1 through 20, corresponding and retained in windows 52a through 52t. Follower roller 124 will cease to cooperate with extension arm 119 to remove direct current power from solenoid 49 by virtue of contacts 122 and 123 of solenoid deenergizer microswitch 121 ceasing to cooperate with each other for the complete duration of sequential programming of slides 1 through 20, corresponding and retained in windows 52a through 52t. Follower roller 33 of control scanner motor stop microswitch 31, cooperates normally with the high portion of cam 24 preventing contacts 32 and 34 from cooperating with each other, while follower roller 28 of automatic programming actuator microswitch 26, positioned on the low portion of cam 24, maintains contacts 27 and 29 of microswitch 26 in a cooperative relationship and prevents contacts 27 and 30 of said microswitch 26 from cooperating with each other until 355° of clockwise rotation of said cam 24 has been completed by virtue of motor 6 being activated for the purpose of recording or reproducing sound track 97 and returning scanner along return trace 98 to its initial start position 97a.

Also in the pre-operative mode, contacts 42 and 44 of microswitch 41 will not cooperate with each other, contacts 46 and 48 of microswitch 45 will not cooperate with each other, contacts 102 and 104 of microswitch 101 will not cooperate with each other, contacts 75 and 76 of switch 74 will not cooperate with each other, contacts 79 and 80 will not cooperate with contactor 78 of push button 77, contacts 68 and 69 of relay 66 will not cooperate with each other, contacts 122 and 123 of solenoid deenergizing microswitch 121 will cooperate with each other keeping solenoid 49 electrically energized, and contacts 72 and 73 of relay 66 will not cooperate with each other, preventing the application of direct current power to motor 6 and hence the rotation of the armature of motor 6 and driveshaft 8, and the driving of the scanning mechanism thereby.

Record or Reproduce Mode

Referring to FIG. 7, in either the pre-operative mode or the operative mode, there will be a record mode as well as a reproduce mode governed by the position of the record-reproduce switch 81. FIG. 7 illustrates the record-reproduce switch 81, schematically in the record position, the opposite position of the three movable contacts 83, 85, and 88 of said switch 81 to those shown in FIG. 7 will therefore be the reproduce position of switch 81. In the record position, contact 83 cooperates with contact 82 thereby electrically connecting the output of modulator 93 to the record-reproduce head 64. Contact 85 and 86 cooperate with each other thereby also electrically connecting the output of amplifier 94 to the record-reproduce head 64. Contacts 88 and 89 cooperate with each other thereby connecting the output of microphone 92 to the input of amplifier 94 thus completing the record capabilities of the combination microphone, amplifier, modulator (high frequency), and record-reproduce head, when relative motion of head 64 cooperating with recording surface occurs, thereby scanning sound track 97. In the reproduce position, contact 82 cooperates with contact 84 thereby removing modulator 93 and connecting record-reproduce head 64 to the input of amplifier 94 by virtue of cooperation of contacts 88 and 90 also disconnecting microphone 92, and contacts 85 and 87 cooperate with each other thereby connecting loud speaker 91 to the output of amplifier 94, thus completing the reproduce capabilities of the combination record-reproduce head, amplifier, and loud speaker, when relative motion of record-reproduce head 64 with respect to the sound track 97 occurs, said track 97 located on the magnetic oxide surface of either drum or of the disk.

It should be noted that motor 35 is normally a geared down motor so that rotational speed of shaft 36 is comparatively slow. This characteristic allows reasonable injection speeds of slides as well as permitting rapid stopping of motor 35 when power is removed therefrom upon rotation of cam 40 from the 20th to the first high portion of said cam 40, follower roller 43 cooperating with the contour of cam 40, and similarly from the first high portion to the second high portion until all slides have been injected and the 20th slide is again in normal position. Extension arm 119 will be moved due to rotation of shaft of motor 35, thereby causing contacts 122 and 123 of microswitch 121 to cease to cooperate with each other, deenergizing solenoid 49 and releasing record-reproduce assembly 17 so that record-reproduce head 64 cooperates with recording surface 53 at point 97a on the sound track, when drum 4 is used, and with similar points 97a when either drum 109 or disk 106 is used. Follower roller 47 of microswitch 45 will cause microswitch 45 to activate relay 66 which will cause contacts 72 and 73 to cooperate with each other, causing sound track scanner drive motor 6 to be activated. However, motor 6 also being a geared down motor to permit relatively slow scanning action of sound track 97, will be slow in starting rotation of its shaft 8. Shafts 8 and 36 will be rotated at substantially the same speed. Therefore, activation of control relay 66 which automatically starts motor 6 will not occur for approximately 15° of cam 40 rotation. This time delay will permit record-reproduce head 64 to be positioned on the record-reproduce surface with approximately 12° of cam 40 rotation time to spare prior to record or reproduce action, when drum 4 or drum 109 is used. When disk 106 is used, there being no solenoid involved, 15° of cam 40 rotation time will be available in terms of time delay prior to record or reproduce action.

Operative Modes and Automatic Programming

Referring to FIGS. 1, 2, 3, 4, 5, 6, 7, 8, and 9, wheather drum 4, drum 109, or disk 106 is injected into the projector in a keyway through which keyed shaft 36 extends, so that either the said drums or disk is positioned at the same location, aligning the 20th slide with the optical projection system, and push button 77 is manually momentarily depressed so that movable contactor 78 cooperates momentarily with contactors 79 and 80, and switch 74 is not manually operated so that contacts 75 and 76 do not cooperate with each other, and direct current power is applied to motor 35 from power means 95 and 96, electrically energizing motor 35 and causing shaft 36 to rotate cam 40, thereby causing follower 43 mechanically affixed to movable contactor 42 to move from the 20th high portion of cam 40 to the 20th low portion of said cam 40, thereby causing contacts 42 and 44 to cooperate with each other and maintain direct current power to motor 35 even after the push button 77 is no longer manually depressed, until cam 40 is automatically rotated 18° by shaft 36 of motor 35, so that follower 43 comes to rest on the next-in-clockwise sequence or first high portion of said cam 40. Simultaneously, follower 47 positioned cooperatively with the 20th low portion of cam 40 will follow the 20th low portion of said cam 40 until the first high portion of cam 40 is encountered, at which time contactor 46 mechanically attached to follower 47, will be moved by the first high portion of cam 40 to cause contact 46 to cooperate with contact 48, thereby momentarily causing direct current power to be applied by power means 95 and 96 to coil 67 of control relay 66, causing relay 66 to be energized and activated. Holding contacts 68 and 69 will cooperate with each other thereby electrically locking relay 66 into its energized position by virtue of power being delivered to relay coil 67 through cooperating contacts 68 and 69. Follower roller 47 will simultaneously be positioned on the first low portion of cam 40 due to completion of 18° of cam 40 rotation, thereby causing contacts 46 and 48 to cease to cooperate. At the same time, slide one aligned within window 52a is aligned with the optical projection system and motor 35 had driven drum 4 or drum 109 or drum 106 an angular distance of 18° from its starting position or from window 52t to window 52a, and said motor 35 is automatically stopped. At the same time extension arm 99 had ceased to cooperate with follower roller 103, causing contacts 102 and 104 of program termination microswitch 101 to cooperate with each other and remaining in this cooperative relationship until cam 40 had returned to its initial preoperative position after 20 sound tracks had been scanned which are associated with each of 20 slides in windows 52a through 52t which had been projected. Automatic activation of microswitch 101 so that contacts 102 and 104 cooperate with each other, is only important when automatic programming switch 74 is manually operated; this enables sequential operation of slides and accompanying sound tracks automatically, until all 20 slides and associated 20 sound tracks had been utilized. For single slide operation, that is injecting each slide individually by manually operating the push button 77, microswitch 101 activation is not required. Extension arm 119 ceasing to cooperate with follower roller 124 upon activation of motor 35, will cause cooperating contacts 122 and 123 of microswitch 121 to cease to cooperate, thereby deenergizing solenoid 49 which will cause head 64 to be placed in cooperative relationship with sound track 97 at point 97a by virtue of extension 51 releasing record-reproduce head assembly 17, and tension spring 19 causing said assembly 17 to be pivoted about axis of pivot pin 18. Simultaneously with the activation of relay 66 due to cooperation of contacts 46 and 48 of microswitch 45 initiated by cooperation of roller 47 with the first high portion of cam 40, relay coil 67 is energized and holding contacts 68 and 69 cooperate with each other and hold relay 66 energized and by cooperative action of contacts 72 and 73, motor 6 will be energized and driveshaft 8 will be rotated, thereby starting scanning action of the mechanical scanner as hereinabove described. When shaft 8 driving cam 24 as well as cam 23 starts to rotate due to rotation of motor 6 armature which is initiated by cooperative action of contacts 72 and 73 thereby applying direct current power from power means 95 and 96 to said motor 6, and cam 24 starts to rotate in same direction as cam 23 thereby causing follower roller 33 mechanically affixed to movable contactor 32 of microswitch 31 to be moved from its position on the high portion of cam 24 to the low portion of cam 24 thereby causing contacts 32 and 34 of microswitch 31 to cooperate with each other applying direct current power to said motor terminals until 360° or the high portion of cam 24 has again established a cooperative relationship with roller 33. Since the rotation time of cam 24 is identical to the scanning time of sound track 97 and the time of the return trace 98, it is seen that at 355° of cam 24 rotation return trace 98 will begin, terminating at 360° of cam 24 rotation or otherwise referred to as the initial pre-operative position of said cam 24. At 355° completion of cam 24 rotation, analogous to the completion of the scanner action, follower roller 28 which is mechanically affixed to movable contact 27, is repositioned from the low portion of cam 24 to the high portion of cam 24. When the high portion of cam 24 momentarily cooperates with roller 28, movable contact 27 is moved away from a cooperative relationship with contact 29, thereby disconnecting direct current power from contact 29 and momentarily causing cooperation of contact 27 with contact 30 which causes direct current power to be applied to contact 76 of switch 74. The ceasing of cooperation of contacts 27 and 29, removes direct current power from relay coil 67 by interrupting power to the holding contacts 68 and 69 thereby causing relay 66 to be deenergized, and causing contacts 72 and 73 to cease cooperating with each other. However, inasmuch as contacts 32 and 34 of microswitch 31 are still in cooperative relationship with each other, direct current power will continue to be applied to motor 6 until the high portion of cam 24 again cooperates with roller 33, thereby completing 360° of cam 24 rotation, causing contacts 32 and 34 to cease cooperating with each other, and removing direct current power from motor 6, thus stopping rotation of armature of said motor 6. Simultaneously with the record-reproduce cycle termination action, contacts 27 and 29 will again cooperate with each other, enabling direct current power to again be applied to holding contact 68 of control relay 66 for readying the next-in-sequence slide and record-reproduce sound track combination for injection and repetition of record-reproduce recycling action.

It should be remembered that contacts 27 and 30 cooperated with each other at 355° of cam 24 rotation, and when automatic programming switch 74 had been previously manually operated so that contacts 75 and 76 cooperate with each other, direct current power applied through cooperating contacts 27 and 30, and cooperating contacts 102 and 104, caused power to be applied to motor 35 which automatically injected the next-in-sequence slide and repeated its entire record or reproduce cycle. This action was made possible by choosing motors 35 and 6 and their speed reducing gears internal to said motors in such a manner so that both motor shafts are automatically rotated at substantially the same speed, and at 355° of cam 24 rotation only 5° of cam 24 rotation remains during which time the retrace path 98 is accomplished. Whereas motor 35 becomes operative with 5° of cam 24 rotation remaining, there nevertheless is a 15° lag between the moment of cooperation of contacts 27 and 30, and the moment of cooperation of contacts 46 and 48 which upon cooperation energize control relay 66. There is a net differential of 10° of cam 40 rotation between cessation of motor 6 armature rotation and resumption of rotation of said armature during the automatic programming of slides and related sound tracks. This differential permits ample time for the slide injection action to terminate prior to the start of sound track scanning action, automatically. When automatic and sequential slide programming is not desired, that is, the automatic programming switch 74 is not used (the contacts 75 and 76 are not in a cooperative relationship), the 10 said degrees of cam 40 differential is not required inasmuch as no power may be automatically applied to motor 35 upon completion of cam 24 rotation, and the scan cycle will be terminated. In order to inject the next-in-sequence slide and repeat the scan cycle, switch 77 will again therefore have to be momentarily manually depressed.

I claim:

1. A still slide projector of the class that optically projects any of a plural number of visual information slides, said slides being automatically injected into said projector by rotation of a generally circular-shaped member which retains said slides, comprising in combination:
   a plural number of slide means, said slide means bearing said visual information slides and being an integral portion of an audio information record on which individual sound tracks corresponding to the slides are recordable or reproducible within the confines of the segmentary portions of the audio information record;
   injection means for rotating said sound and slide retainer means in incremental steps of one of said segmentary portions at a time;
   a record-reproduce head for recording the sound tracks on said segmentary portions or for reproducing said sound tracks therefrom; and
   a sound track scanner in operative relationship with said audio information record for automatically scanning a sound track thereon and producing sound therefrom, comprising:
   reciprocating means movable in a first horizontal direction and also in a second horizontal direction opposite to said first horizontal direction; and
   translation means cooperating with said reciprocating means for imparting motion to said reciprocating means in a vertical direction substantially perpendicular to the horizontal directions thereby providing a generally oscillatory path of translation of said reciprocating means, said head being attached to said reciprocating means and moving in directions corresponding to the horizontal and vertical directions of movement of said reciprocating means, said translation means also including means for returning the portion of said reciprocating means carrying said head from a terminating location of said generally oscillatory path to a predetermined starting location thereof in a path substantially parallel and opposite to said vertical direction.

2. The apparatus as stated in claim 1:
   said generally cirular-shaped member being a drum; and
   each of said segmentary portions being substantially in the same plane as each of a corresponding plural number of the visual information slides.

3. The apparatus as stated in claim 1:
   said generally circular-shaped member being a drum and having said segmentary portions in planes orthogonal to any of the planes of said visual information slides.

4. The apparatus as stated in claim 1:
   said generally cirular-shaped member being a disk which has the visual information slides radially disposed about said disk in the same plane as the plane of the disk.

5. The apparatus as stated in claim 1, including:
a film strip retained in said generally circular-shaped member, and comprising said visual information slides.

6. The apparatus as stated in claim 1, including:
at least one slide in said generally circular-shaped member.

7. The apparatus as stated in claim 1, including:
means for controlling the individual positioning of said segmentary portions, one of said segmentary portions at a time, and for enabling scanning action of at least a portion of one of the segmentary portions.

8. The apparatus as stated in claim 1, including:
a control circuit for controlling the scan time of each of said sound tracks.

9. The apparatus as stated in claim 4, including:
a control circuit for controlling the scan time of each of the plural number of sound tracks.

10. The apparatus as stated in claim 1, including:
sequencing means for automatically sequencing the slide means upon completion of scanning action of each of the sound tracks.

* * * * *